(12) United States Patent
Kume et al.

(10) Patent No.: US 6,986,232 B1
(45) Date of Patent: Jan. 17, 2006

(54) ULTRASONIC SEALING APPARATUS

(75) Inventors: Satoshi Kume, Tokushima-ken (JP); Mitsuhiko Shinohara, Tokushima-ken (JP); Takeshi Iseki, Tokushima-ken (JP); Michio Ueda, Tokushima-ken (JP)

(73) Assignee: Shikoku Kakoki Co., Ltd., Tokushima-ken (JP)

( * ) Notice: Subject to any disclaimer, the term of this patent is extended or adjusted under 35 U.S.C. 154(b) by 983 days.

(21) Appl. No.: 09/610,263

(22) Filed: Jul. 5, 2000

(30) Foreign Application Priority Data

Jul. 5, 1999 (JP) .................................. 11-191040

(51) Int. Cl.
*B32B 31/00* (2006.01)

(52) U.S. Cl. ................. 53/371.2; 53/DIG. 2; 53/374.2; 53/552; 156/466

(58) Field of Classification Search ................ 53/371.2, 53/374.2, 552, DIG. 2; 156/466
See application file for complete search history.

(56) References Cited

U.S. PATENT DOCUMENTS

| | | | | |
|---|---|---|---|---|
| 3,956,046 A | * | 5/1976 | Tsuchiya et al. ............ 156/580 |
| 3,962,508 A | * | 6/1976 | Nakanose .................. 24/16 PB |
| 4,159,220 A | * | 6/1979 | Bosche et al. .............. 156/358 |
| 4,403,465 A | * | 9/1983 | Bachner .................. 156/580.2 |
| 4,534,818 A | * | 8/1985 | Kreager et al. ............. 156/466 |
| 4,630,429 A | * | 12/1986 | Christine .................... 156/515 |
| 4,759,170 A | * | 7/1988 | Sawa et al. .................... 53/551 |
| 4,767,492 A | * | 8/1988 | Fukusima et al. ........ 156/580.2 |
| 5,067,302 A | * | 11/1991 | Boeckmann ................ 53/374.2 |
| 5,564,255 A | * | 10/1996 | Giacomelli ................ 53/371.2 |
| 5,714,033 A | * | 2/1998 | Hayashi et al. ............. 156/251 |
| 5,733,411 A | | 3/1998 | Bett |
| 5,890,347 A | * | 4/1999 | Giacomelli et al. ...... 156/580.1 |
| 5,924,267 A | * | 7/1999 | Bomer et al. .................. 53/482 |
| 5,976,315 A | * | 11/1999 | Martin ..................... 156/580.1 |

FOREIGN PATENT DOCUMENTS

| | | |
|---|---|---|
| DE | 29 22 834 A1 | 12/1980 |
| FR | 2 214 585 A | 8/1974 |
| FR | 2 640 233 A1 | 6/1990 |
| GB | 2 028 224 A | 3/1980 |
| GB | 2 248 796 A | 4/1992 |
| JP | 56-92046 | 7/1981 |
| JP | 62-22784 | 5/1987 |
| JP | 63-147408 | 9/1988 |

(Continued)

*Primary Examiner*—John Sipos
*Assistant Examiner*—Michelle Lopez
(74) *Attorney, Agent, or Firm*—Venable LLP; Ann S. Hobbs; Robert Kinberg (57) ABSTRACT

An ultrasonic sealing apparatus prevents a sealing failure by preventing a tunnel (through passage) to form in the step portions in the vicinity of both end portions of longitudinally sealed portions, when the tubular laminated packaging material is transversely ultrasonically sealed. An ultrasonic sealing apparatus, in which a laminated packaging material containing a thermoplastic resin layer and a paper layer is formed into a tubular form and the tubular laminated packaging material is transversely ultrasonic sealed, includes a horn having an elongated and flat sealing face and an opposing jaw having an elongated pressing face which presses the laminated packaging material in cooperation with the sealing face of the horn, wherein the center portion in longitudinal direction of the pressing face of the opposing jaw is narrower than both end portions of the pressing face. Further, at a center portion in longitudinal direction of a pressing face of the opposing jaw, a recess having an arc shape, etc. in section is formed along a direction perpendicular to the longitudinal direction of the pressing face.

8 Claims, 12 Drawing Sheets

FOREIGN PATENT DOCUMENTS

| | | |
|---|---|---|
| JP | 6-15741 | 1/1994 |
| JP | 3004786 | 9/1994 |
| JP | 7-2231 | 1/1995 |
| JP | 7-33121 | 2/1995 |
| JP | 2544450 | 7/1996 |
| WO | WO 96 21595 A1 | 7/1996 |
| WO | WO 98 25824 A1 | 6/1998 |
| WO | WO 99/48759 | 9/1999 |

* cited by examiner

ULTRASONIC SEALING APPARATUS

CROSS REFERENCE TO RELATED APPLICATIONS

Priority is claimed with respect to Japanese Application No. 11/191040 filed Jul. 5, 1999, in the Japanese Patent Office, the disclosure of which is incorporated herein by reference.

BACKGROUND OF THE INVENTION

1. Field of the Invention

The present invention relates to an ultrasonic sealing apparatus for transversely sealing a tubular laminated packaging material filled with a content such as a liquid beverage, and more particularly to an ultrasonic sealing apparatus provided with an opposing jaw having a specified shape for improving sealability by controlling molten thermoplastic resin flow.

2. Description of the Related Art

Figure 1:
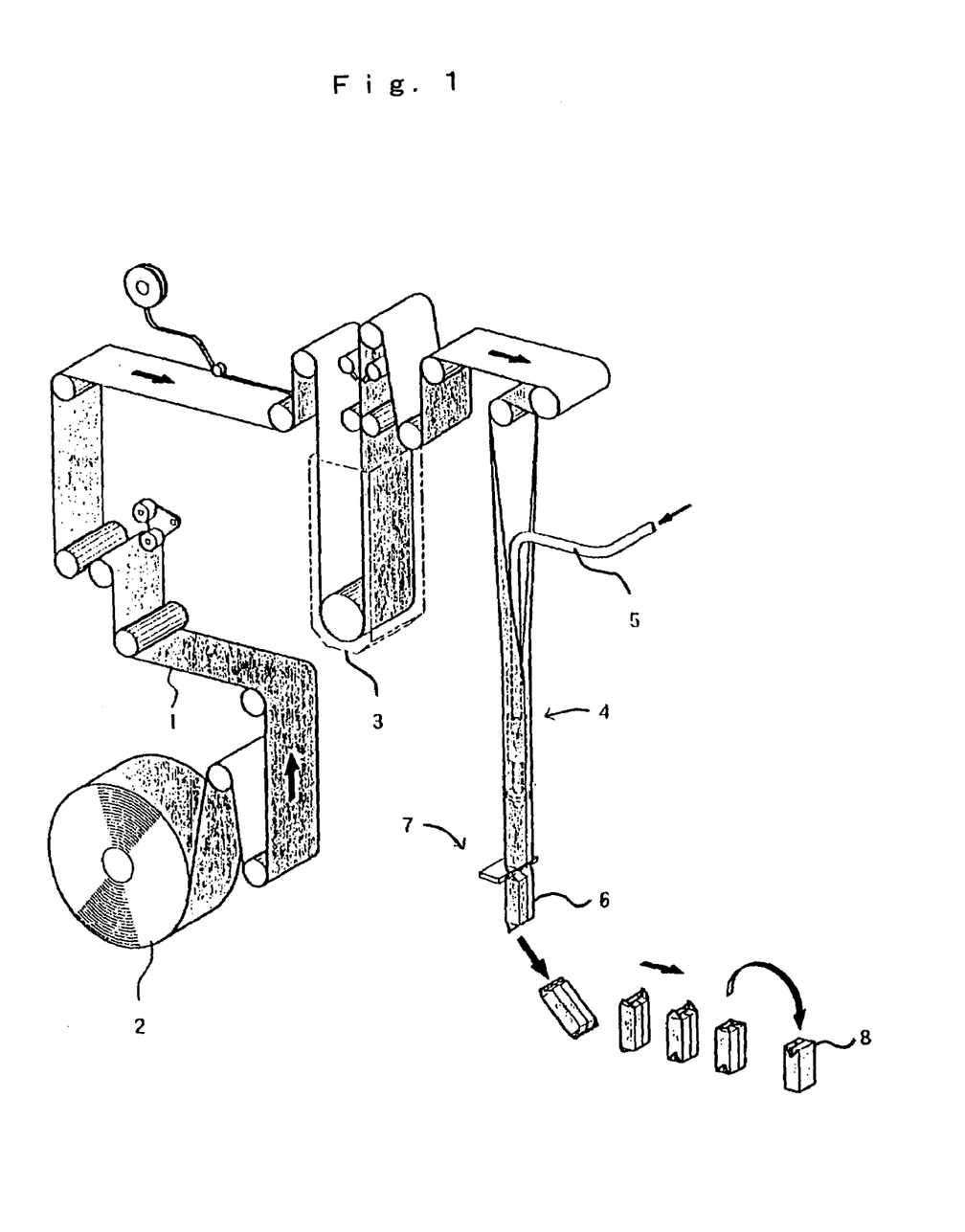
FIG. 1 is a view explaining a process where a paper packaging container is formed by a conventional filling and packaging machine.

Hitherto, as a packaging machine in which a packaging material web for a rectangular parallelepiped packaging container filled with juice, etc. is used by being sterilized, there has been known a filling and packaging machine shown in FIG. 1. In summary, the filling and packaging machine comprises a rewinder 2 supporting a laminated packaging material web 1 in a rolled state, a sterilization device 3 for sterilizing the plate-shaped laminated packaging material web successively rewound from the rewinder, a longitudinal sealing section 4 for sealing longitudinally both end portions of the sterilized laminated packaging material web an thereby forming a tubular laminated packaging material web, a liquid supply tube 5 for filling a fluid into the web formed in tubular form, a transverse sealing device 7 for transversely sealing the tubular laminated packaging material web in a direction perpendicular to the longitudinal direction thereof with a fluid while feeding downward a tube filled with the content by a length substantially corresponding to one package and, at the same time, continuously forming a pillow-shaped container 6 whose sectional shape is rectangle, and a shaping device for forming the pillow-shaped container 6 by folding its end portions into a rectangular parallelepiped container 8 which is a final form. And, the transversely sealing device 7 is composed of a sealing unit, a sealing jaw for fixing the sealing unit, and driving means for driving the sealing jaw.

Further, as the ultrasonic sealing apparatus, besides an ultrasonic sealing apparatus which comprises a piezoelectric driving unit having a piezoelectric ceramic plate or a magnetostriction driving unit, that is connected to an AC supply source, and a horn having an elongated sealing face, and which is characterized by further having one or more reaction bodies that together with the horn form a frequency of a half wavelength (Japanese Patent Laid-Open No. 2231/1995), there have been known many ultrasonic sealing apparatuses (Japanese Patent Publication No. 22784/1987, Japanese Patent Publication No. 2544450/1996, Japanese Patent Laid-Open No. 33121/1995, Japanese Patent Laid-Open No. 92046/1981, Japanese Patent Laid-Open No. 15741/1994, and the like).

Among these ultrasonic sealing apparatuses, there has been known an ultrasonic sealing apparatus for sealing openings at upper and lower ends of a formed cylindrical liquid container having an overlapping bonded portion approximately at a center of a container portion which includes a horn and an anvil, wherein a band-shaped ridge is provided nearly at a center of a face of the horn butting against a portion to be sealed, a concave groove perpendicular to the ridge is provided nearly at a center of a face of the anvil butting against the portion to be sealed, a bottom portion of the concave groove is made into a two-step structure and its step portion and both end portions are tapered, and an acute angle protruded slant face extending sideward is provided at an end portion of the center of the bottom portion (Japanese Utility Model Laid-Open No. 147108/1988, Registered Utility Model No. 3004786).

Figure 2:
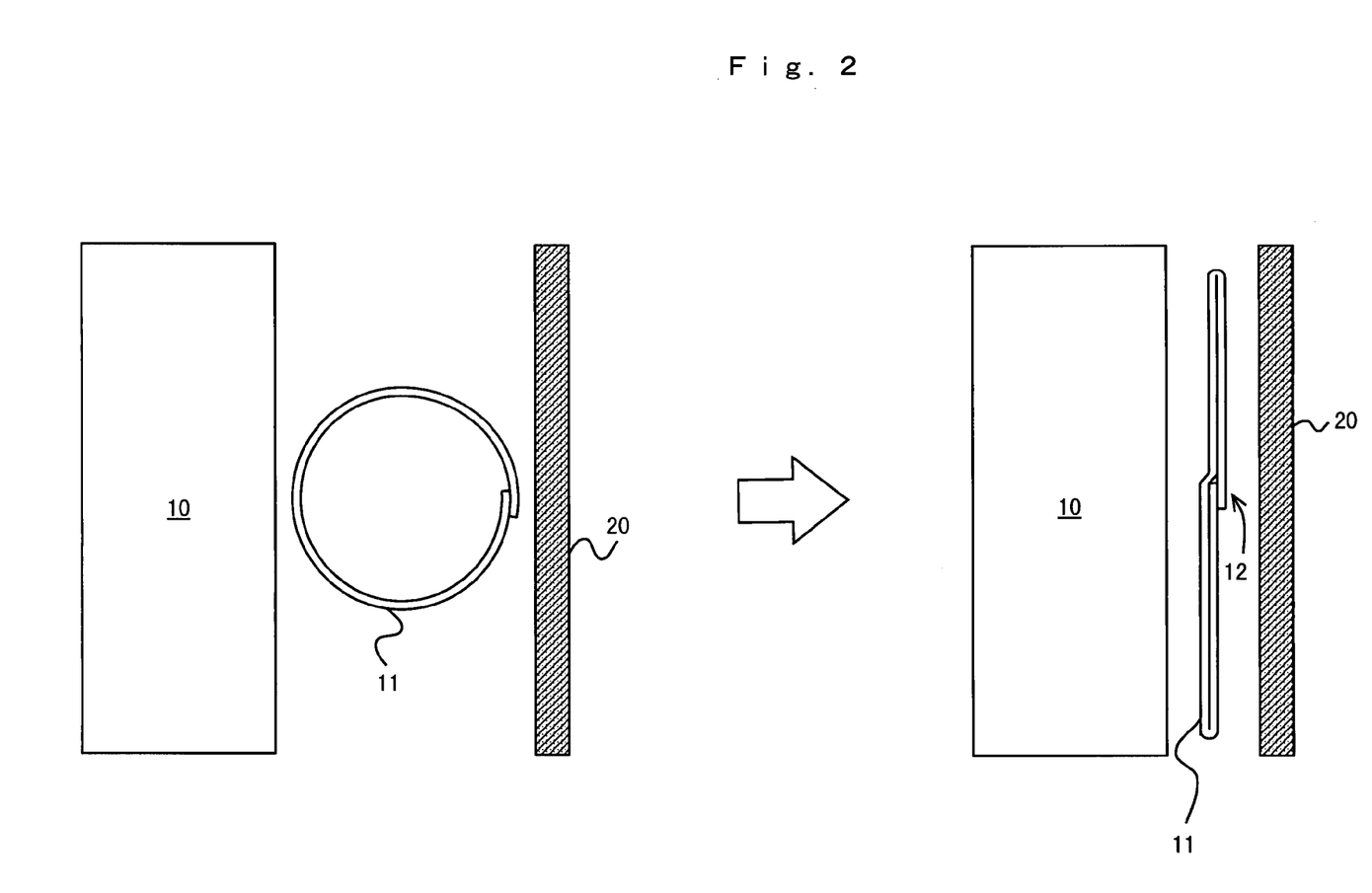
FIG. 2 is a diagram explaining the before and after states of a tubular laminated packaging material that is pressed where the tubular laminated packaging material is transversely sealed.

As shown in FIG. 2, a tubular laminated packaging material 11 filled with a content such as a liquid beverage is transversely ultrasonically sealed with a fluid by using a sealing jaw 10 consisting of a horn and an opposing jaw 20. The tubular laminated packaging material is pressed together and, as a result, a thickness of a longitudinally sealed three-ply portion 12 is larger than that of the remaining two-ply portion. The inventors of the present invention have discovered a problem in that steps are formed in the vicinity of both end portions of the longitudinally sealed portion. As a result of the steps, the sealing pressure becomes uneven so that a tunnel (through passage) occasionally occurs in the step portions, thereby generating a sealing failure.

SUMMARY OF THE INVENTION

An object of the invention is to provide an ultrasonic sealing apparatus capable of preventing the sealing failure owing to the tunnel (through passage) occasionally occurring in the step portions in the vicinity of both end portions of the longitudinally sealed portion when the tubular laminated packaging material is transversely ultrasonically sealed with a fluid and the like.

In order to solve the above problem, the inventors of the present invention studied ultrasonic sealing in which a laminated packaging material was made into a tubular form and the tubular laminated packaging material was transversely heat sealed with a fluid. In this study, there was provided such a means similar to means used in a high frequency heat sealing apparatus where a ridge is provided in a high frequency coil (heating source), i.e., a ridge for applying a strong pressing force to a sealing face of an ultrasonic horn (heating source). The study found that it became difficult to maintain an evenness in vibration owing to the ridge provided on the sealing face of the horn and, for this reason, a new sealing failure occurred.

Accordingly, differing from a conventional solving method in which a shape for improving sealability is given to the sealing face of a heating source side, the ridge was provided on a pressing face of an opposing jaw for pressing a laminated packing material in cooperation with the sealing face of the horn. It was found that this was somewhat effective for preventing the tunnel or through passage from occurring, but a new problem surfaced in that the laminated packaging material was injured by the ridge. Therefore, means for increasing the pressing force applied to a pressing face without providing a protruded portion such as the ridge were studied. As a result, it was found that if a center portion was formed in the longitudinal direction of a pressing face of the opposing jaw, and against which a longitudinally sealed portion of the three-ply portion was butted to achieve a pressing face narrower than both end portions, a necessary pressing force could be evenly applied to the longitudinally sealed portion of the three-ply portion without injuring the laminated packaging material, and thereby the invention was completed.

Further, in order to solve the above problem, the inventors of the present invention studied an opposing jaw in an ultrasonic sealing apparatus in which a laminated packaging material is formed into a tubular form and the tubular laminated packaging material is transversely heat sealed with a fluid, by manufacturing those having pressing faces of various shapes by way of trial. During a process of the above study, It was found that there was such a case that the tubular laminated packaging material was rotated about a center axis of the tube and so a longitudinally sealed portion of the three-ply portion somewhat deviated from a regular position, i.e., a relief center position of the opposing jaw shown in FIG. 2, and that, as a result, a sufficient pressing force was not applied to either of the step portions in the vicinity of both end portions of the longitudinally sealed portion. Accordingly, means capable of applying an even pressing force to both of step portions in the vicinity of both end portions of the longitudinally sealed portion were studied to find means sufficient to seal even if the longitudinally sealed portion deviated from the regular position. As a result, it was found that if, at a center portion in a longitudinal direction of a pressing face of the opposing jaw, a recess having a circular shape and the like in section (relief shape R in FIGS. 13 and 16) was formed along a direction perpendicular to the longitudinal direction of the pressing face, it was possible to evenly apply a necessary pressing force to the longitudinally sealed portion of the three-ply portion, and thereby the invention was completed.

That is, the present invention relates to an ultrasonic sealing apparatus, in which a laminated packaging material containing at least a thermoplastic resin layer is formed into a tubular form and the tubular laminated packaging material is transversely ultrasonic sealed, comprising a horn having an elongated and flat sealing face and an opposing jaw having an elongated pressing face pressing the laminated packaging material in cooperation with the sealing face of the horn, characterized in that a center portion in the longitudinal direction of the pressing face of the opposing jaw is formed into a pressing face narrower than both end portions.

An ultrasonic sealing apparatus according to the invention may be characterized in that the laminated packaging material contains a paper layer.

An ultrasonic sealing apparatus according to the invention may be characterized in that the transverse ultrasonic sealing is ultrasonic sealing with a fluid. An ultrasonic sealing apparatus according to the invention may be characterized in that a length of a center portion, in longitudinal direction of the pressing face of the opposing jaw, which forms the pressing face narrower than both end portions is at least larger than a length of a longitudinally sealed three-ply portion of the tubular laminated packaging material under a pressed state.

An ultrasonic sealing apparatus according to the invention may be characterized in that a width of the narrow pressing face of the center portion in longitudinal direction is ¼ to ½ of a width of the pressing face at both end portions. The ultrasonic sealing apparatus according to the invention may be modified so that the narrow pressing face of the center portion in the longitudinal direction has a recess formed along a direction perpendicular to the longitudinal direction of the pressing face. The formed recess is a recess having an arc shape in section.

An ultrasonic sealing apparatus according to the invention characterized in that, when the laminated packaging material is formed into the tubular form, the laminated packaging material is formed into the tubular form by using a sealing tape.

Further, the present invention relates to an ultrasonic sealing apparatus, in which a laminated packaging material containing at least a thermoplastic resin layer is formed into a tubular form and the tubular laminated packaging material is transversely ultrasonically sealed, comprising a horn having an elongated and flat sealing face and an opposing jaw having an elongated pressing face pressing the laminated packaging material in cooperation with the sealing face of the horn, characterized in that, at a center portion in the longitudinal direction of a pressing face of the opposing jaw, a recess is formed along a direction perpendicular to the longitudinal direction of the pressing face. The laminated packaging material according to the invention may contain a paper layer. Further, the transverse ultrasonic sealing is an ultrasonic sealing with a fluid.

An ultrasonic sealing apparatus according to the invention wherein a length of a center portion in longitudinal direction of the pressing face of the opposing jaw is at least larger than a length of a longitudinally sealed three-ply portion of the tubular laminated packaging material under a pressed state.

Another ultrasonic sealing apparatus according to the invention may have a recess formed in the center portion characterized in that the formed recess is a recess having an arc shape in section. An ultrasonic sealing apparatus according to the invention characterized in that, when the laminated packaging material is formed into the tubular form, the laminated packaging material is formed into the tubular form by using a sealing tape.

Any laminated packaging material, may be used in the present invention so long as it contains at least a thermoplastic resin layer. Thus, it is possible to exemplify a laminated body comprising an innermost thermoplastic resin such as a polyethylene layer capable of heat sealing by being molten by means of ultrasonic heating, a paper sheet for maintaining rigidity of a container, an aluminum foil layer or a synthetic resin film layer for preventing air, microbes or the like from permeating into the container, and the like. In the case of a high frequency heat sealing, an electrically conductive material such as aluminum foil is an indispensable laminating material but, in case of an ultrasonic heat sealing, it is not always necessary, and an oxygen non-permeable synthetic resin film can be used in place of the aluminum foil and the like. Further, in the case where the laminated packaging material is formed into a tubular form by being longitudinally sealed, it is also possible to perform the longitudinal sealing by using, separately from the laminated packaging material, a sealing tape consisting of a synthetic resin film and the like, for preventing content from permeating from an end face of the packaging material. In this case, it follows that the longitudinally sealed portion of the tubular laminated packaging material is longitudinally sealed under a three-ply state because there exists the sealing tape layer in addition to the two-ply laminated packaging material.

Figure 3:
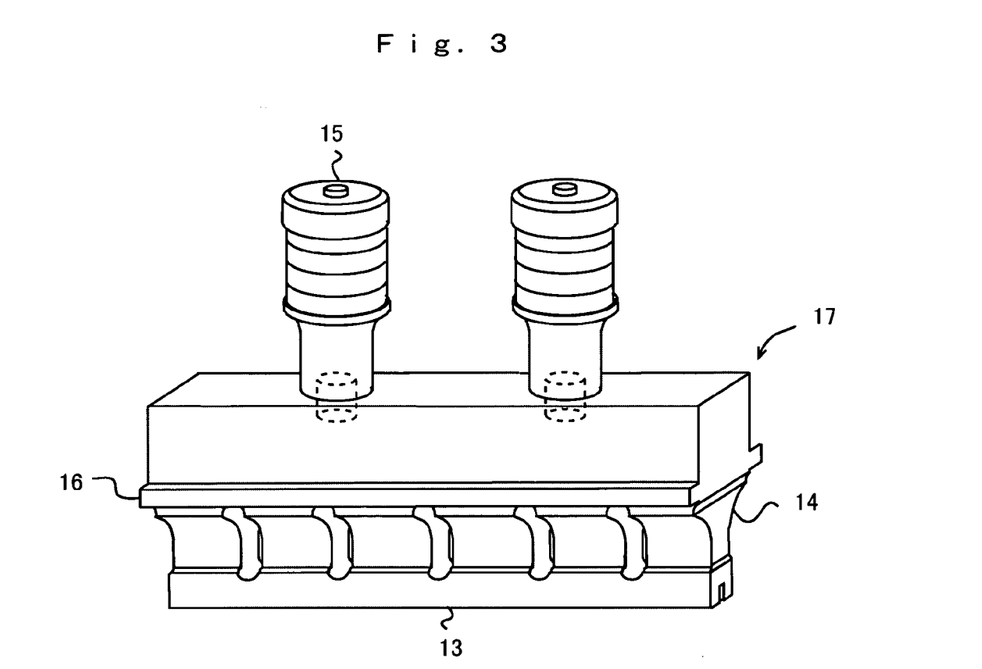
FIG. 3 is a schematic perspective view of an ultrasonic wave generating device capable of being used in an ultrasonic sealing apparatus of the present invention.

In the present invention, as an apparatus in which a laminated packaging material is formed into a tubular form and the tubular laminated packaging material is transversely ultrasonically sealed with a fluid, any ultrasonic sealing apparatus suffices so long as it comprises a horn having an elongated and flat sealing face and an opposing jaw having an elongated pressing face for pressing the laminated packaging material in cooperation with the sealing face of the horn. And besides conventional known ultrasonic sealing apparatuses, for example as shown in FIG. 3. it is possible to exemplify an ultrasonic sealing apparatus 17, which was developed by the present inventors, and which comprises at least one horn 14 having two elongated and flat sealing faces 13 for sealing the packaging material in the longitudinal direction and plural converters 15 provided standing on a side reverse to the sealing faces of the horn 14 and resonating the horn, whose length is a length of one wavelength, and whose fixing position (attaching flange) 16 to a sealing jaw is a knot plane (WO99/48759).

In the present invention, in the case where the horn, which is a heating member having a heating source, is made a sealing jaw, "opposing jaw" is used as a term opposing to the sealing jaw and means one of pressing members, which has no heating source. The opposing jaw is composed of an opposing jaw body and an opposing jaw working portion. And, in a filling and packaging machine of this kind, generally two pairs of pressing members, each consisting of a sealing jaw and an opposing jaw, are used, and two sealed portions are formed by being heat sealed by means of the respective pairs of pressing members. And, the packing containers formed into a pillow-shaped shape are separated by being cut between the two sealed portions.

In the above opposing jaw working portion of the opposing jaw in the ultrasonic sealing apparatus of the present invention, there is formed an elongated pressing face for pressing the laminated packaging material in cooperation with the sealing face of the horn and, in one aspect, the invention relates to an ultrasonic sealing apparatus in which a center portion in longitudinal direction of the pressing face of the opposing jaw is formed into a pressing face narrower than both end portions. Here, "a center portion in longitudinal direction" means a position on the pressing face where a longitudinally sealed three-ply portion of the tubular laminated packaging material at least butts against the pressing face of the opposing jaw, and both end portions of the pressing face are excluded, but a center in longitudinal direction of the pressing face may not necessarily be included. And, in this ultrasonic sealing apparatus, it is desirable that a length of the center portion in longitudinal direction of the opposing jaw working portion's pressing face formed into the pressing face narrower than the both and portions is at least longer than a length of the longitudinally sealed three-ply portion of the tubular laminated packaging material under a pressed state.

Further, it is desirable that a width of the narrow pressing face of the center portion in longitudinal direction is ¼–½, especially about ⅓, of those of the pressing faces of the both end portions. And, since a pressure (P) is found as a quotient (P=F/S) obtained by means of dividing a force (F) by an area (S), in case where the width of the pressing face is narrowed to ⅓ for instance, it follows that a pressure applied hereto is three times of that before being narrowed, so that a sufficient pressing force can be applied to the three-ply longitudinally sealed portion, thereby making it possible to prevent the tunnel or through passage from occurring. As to the pressing face formed narrowly, in case where it is formed in the pressing face nearly parallel to a longitudinal direction of the pressing face such as a center portion in a width direction, a container's interior side and a cutting side, a position in the width direction, is not limited especially.

It is also possible to form, in the pressing face formed narrowly, a recess having an arc shape and the likes in section along a direction perpendicular to the longitudinal direction of the pressing face. By providing such a recess, even if the tubular laminated packaging material is rotated about a center axis of the tube as the axis of rotation and so a longitudinally sealed portion of the three-ply portion somewhat deviates from a regular position, it follows that step portions in the vicinity of both end portions of the longitudinally sealed portion butt against the recessed pressing face formed narrowly, so that it is possible to evenly apply a sufficient pressing force required for an excellent seal to the longitudinally sealed portion of the three-ply portion. As such a recess, the arc shape in section is desirable. However, any shape may suffice so long as it can apply the sufficient pressing force required for the excellent seal to step portions in the vicinity of the both end portions of the longitudinally sealed portion of the three-ply portion even in case where the longitudinally sealed portion of the three-ply portion somewhat deviates from the regular position.

Further, the present invention relates to an ultrasonic sealing apparatus characterized in that an elongated pressing face pressing the laminated packaging material in corporation with a sealing face of a horn is provided in the opposing jaw working portion of the opposing jaw, and a recess having are arc shape and the like in section is formed in a center portion in a longitudinal direction of the pressing face of the opposing jaw along a direction perpendicular to the longitudinal direction of the pressing face. By providing such a recess, even if the tubular laminated packaging material is rotated about a center axles of the tube as the axis of rotation and so a longitudinally sealed portion of the three-ply portion somewhat deviates from a regular position, it follows that step portions in the vicinity of both and portions of the longitudinally sealed portion butt against the recessed action face formed by the recess, so that it is possible to evenly apply a sufficient pressing force required for an excellent seal to the longitudinally sealed portion of the three-ply portion. As such a recess, the arc shape in section is desirable. However, any shape may suffice so long as it can apply the sufficient pressing force required for the excellent seal to step portions in the vicinity of both end portions of the longitudinally sealed portion even in case where the longitudinally sealed portion of the three-ply portion somewhat deviates from the regular position.

DESCRIPTION OF THE PREFERRED EMBODIMENTS

Hereunder, embodiments and the like of the present invention are described in detail referring to FIGS. 4–24, but a technical scope of the invention is not limited to the embodiments. Incidentally, in FIGS. 4–24, 20 denotes an opposing jaw, 21 denotes an opposing jaw body, 22 denotes an opposing jaw working portion, 23 denotes both end portions in a longitudinal direction of a pressing face, 24 denotes a narrow pressing face of a center portion in a longitudinal direction of the pressing face, 25 denotes a recess having an arc shape in section, 26 denotes a recess corresponding to a shape of a longitudinally sealed portion, and 27 denotes recesses of various shapes, respectively.

Figure 4:
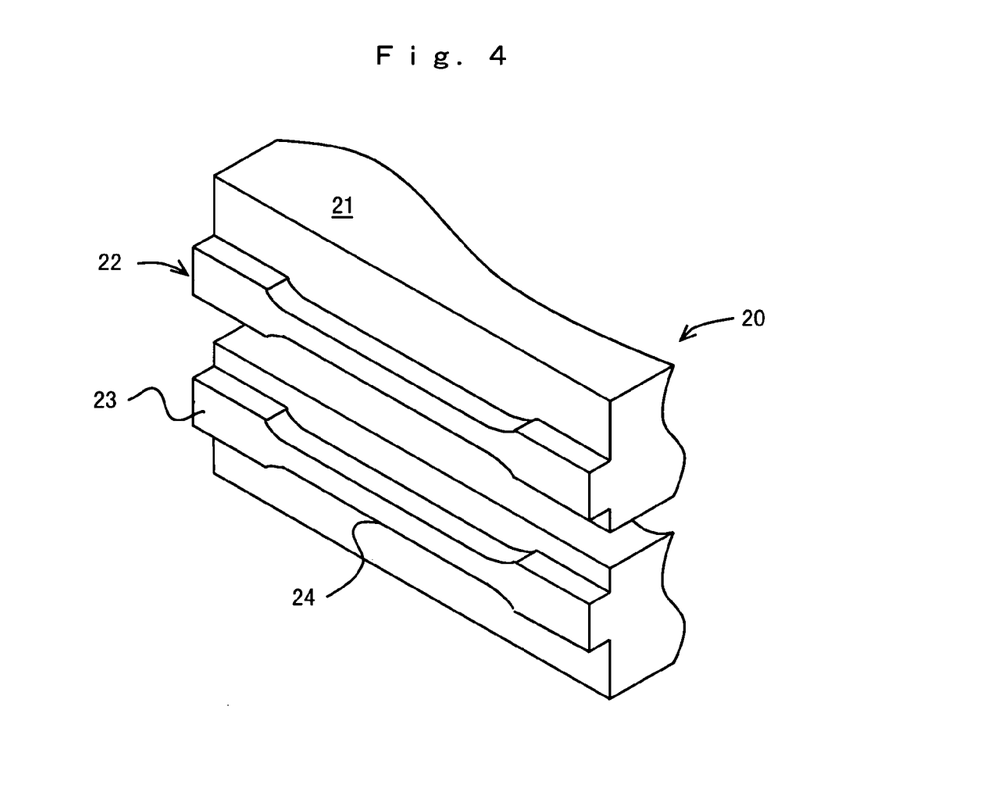
FIG. 4 is a schematic perspective view showing a main portion of an opposing jaw in which a center portion of a pressing face is formed into a narrow pressing face in the ultrasonic sealing apparatus of the present invention.
Figure 5:
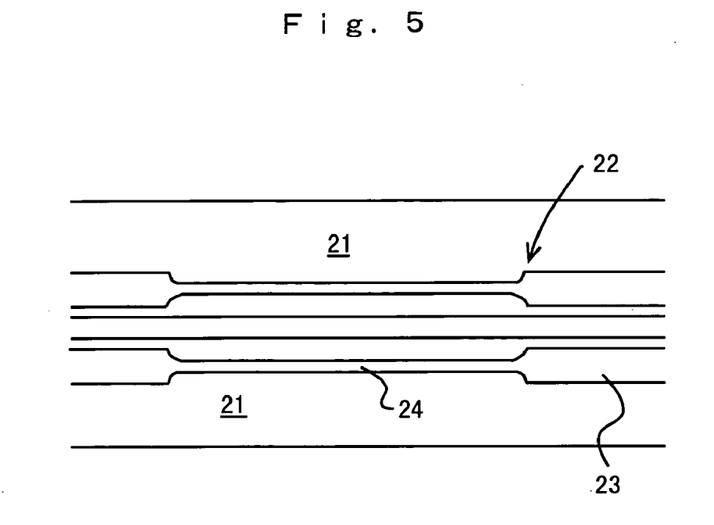
FIG. 5 is a front view showing the main portion of the opposing jaw in which the center portion of the pressing face is formed into the narrow pressing face in the ultrasonic sealing apparatus of the present invention.
Figure 6:
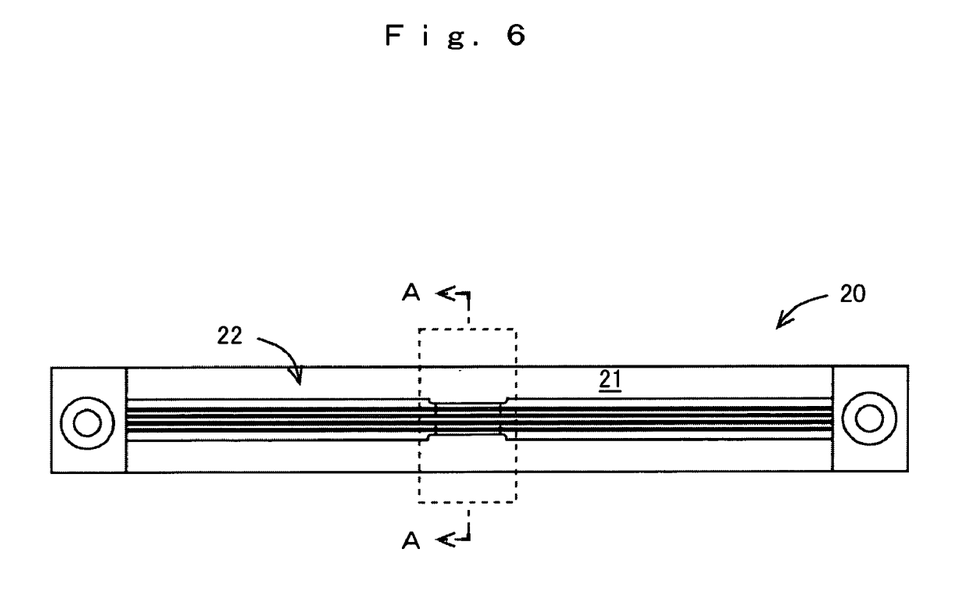
FIG. 6 is a front view showing an opposing jaw of another mode in which a center portion of a pressing face is formed into a narrow pressing face in the ultrasonic sealing apparatus of the present invention.
Figure 7:
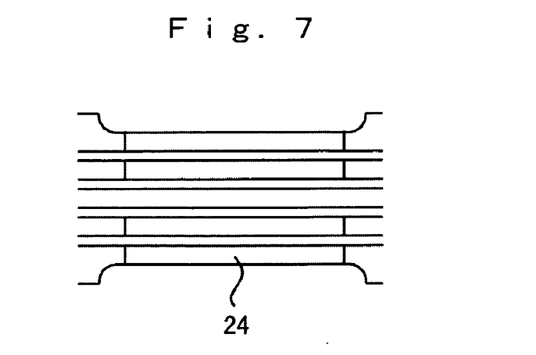
FIG. 7 is an enlarged view showing a central portion surrounded by dashes in FIG. 6.
Figure 8:
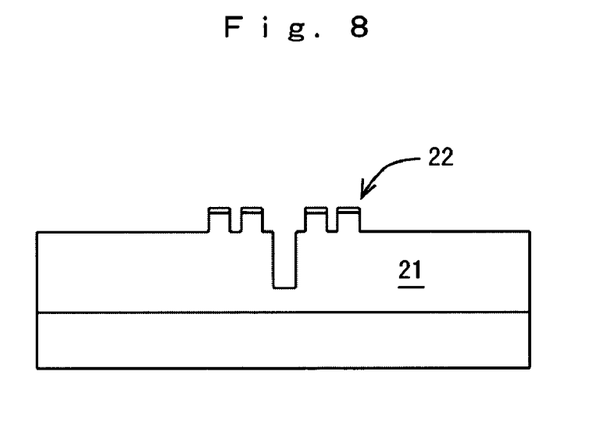
FIG. 8 is a sectional view seen along an arrow line A—A in FIG. 6.
Figure 9:
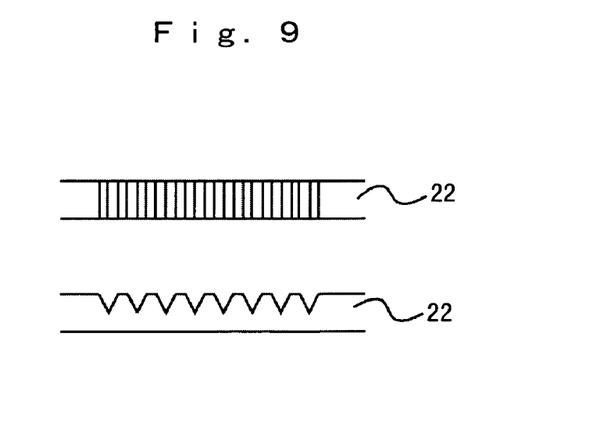
FIG. 9 is a view showing a main portion of an opposing jaw in which notches are formed in a center portion of a pressing face, and which is shown as a reference example.
Figure 10:
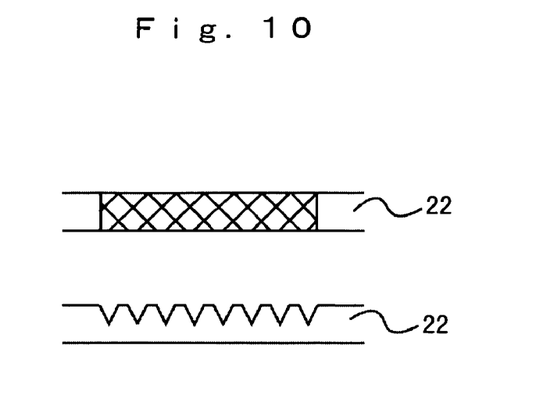
FIG. 10 is a view showing a main portion of an opposing jaw in which notches are formed in a center portion of a pressing face, and which is shown as a reference example of another mode.

In FIG. 4 and FIG. 5, there is shown a main portion of the opposing jaw 20. The center portion formed in a longitudinal direction of the pressing face in the opposing jaw working portion 22 that is provided on one face of the opposing jaw body 21 of the opposing jaw 20 is narrower than the both end portions 23. The narrowly formed pressing face 24 is nearly parallel to a longitudinal direction of the pressing face of the center portion in width direction. Further, in FIGS. 6–8, there are shown the opposing jaws 20 of different types. The opposing jaw 20 shown in FIGS. 6–8 is provided with the two opposing jaw working portions 22 on one face of the opposing jaw body 21. The center portion (shown by dashed lines) in a longitudinal direction of the pressing face of the opposing jaw working portion 22 is formed into the pressing face 24 so that it is narrower than both end portions 23. The opposing jaws having the narrow pressing face 24, especially the opposing jaw shown in FIG. 4 and FIG. 5, is superior in its sealability to the opposing jaws provided with the opposing jaw working portions 22 whose main portions are respectively shown in FIG. 9 and FIG. 10 and which have notches in the center portion in longitudinal direction of the pressing face.

Figure 11:
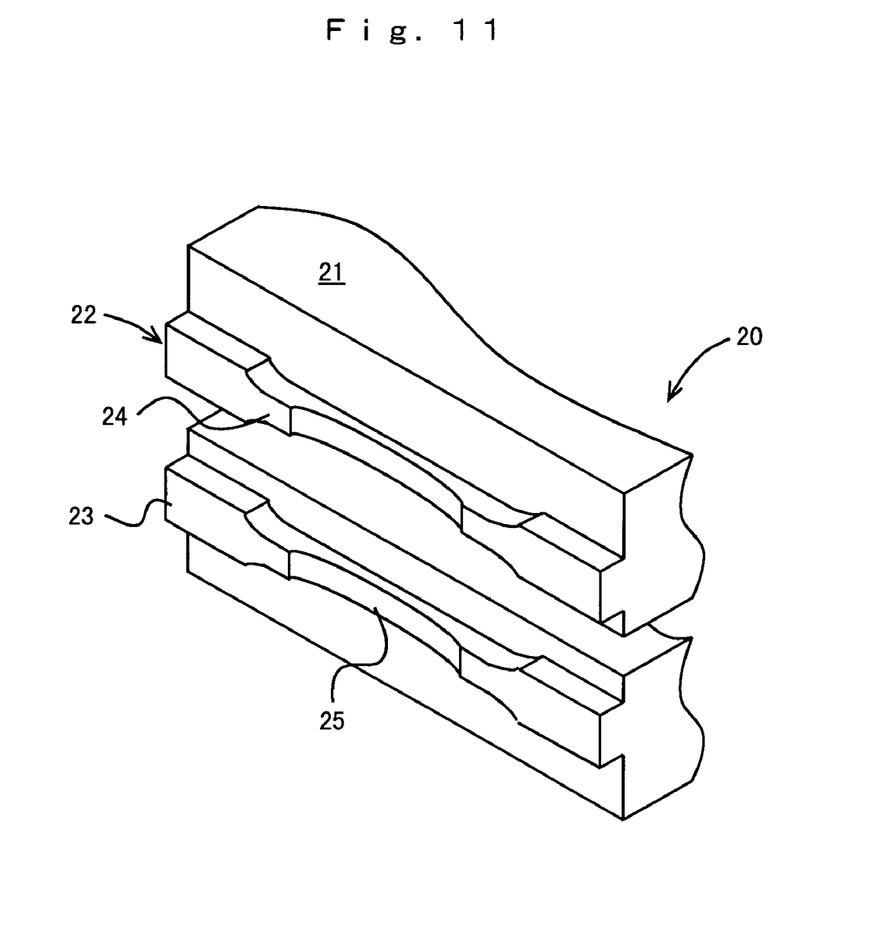
FIG. 11 is a schematic perspective view showing a main portion of an opposing jaw in which a recess having an arc shape in section is formed in a pressing face formed narrowly in the ultrasonic sealing apparatus of the present invention.
Figure 12:
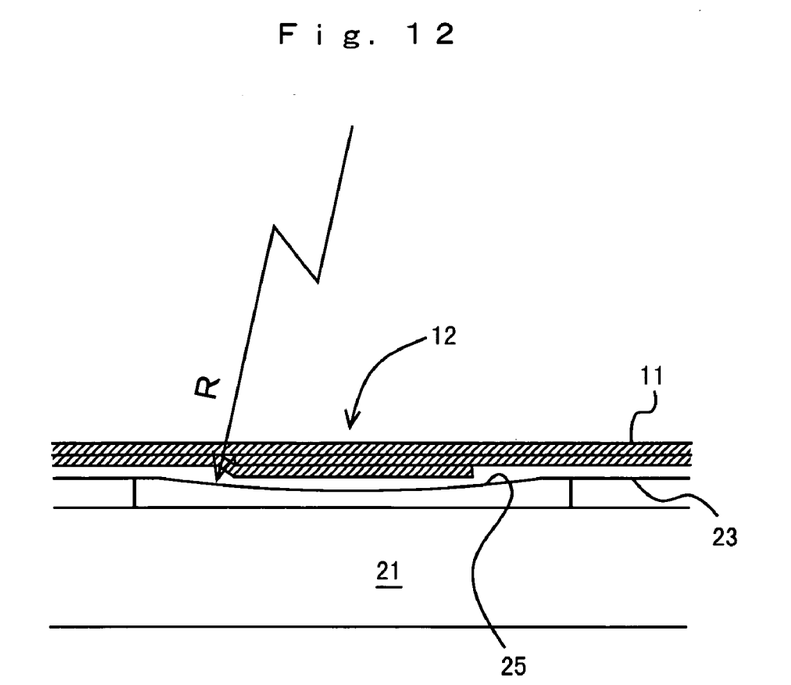
FIG. 12 is a side view showing a laminated packaging material and the main portion of the opposing jaw in which the recess having the arc shape in section is formed in the pressing face formed narrowly in the ultrasonic sealing apparatus of the present invention.

Further, in FIG. 11 and FIG. 12, there is shown a main portion of the opposing jaw 20 in which a recess 25 is formed in the pressing face 24 narrowly along the longitudinal direction of the pressing face. Recess 25 can be arc shaped in cross-section, and the arc is formed narrowly along a direction perpendicular to the longitudinal direction of the pressing face. In FIG. 12, there is shown the state just before the three-ply portion 12 of the laminated packaging material butts against the recesses 25 having an arc shape in section after the tubular laminated packaging material 11 has been pressed. In the ultrasonic sealing apparatus having this opposing jaw 20, a length of the center portion in the longitudinal direction of the pressing face of the opposing jaw working portion 22, which is formed into pressing face 24 narrower than both end portions 23, is longer than that of the longitudinally sealed three-ply portion 12 of the tubular laminated packaging material 11 under a pressed state.

Figure 13:
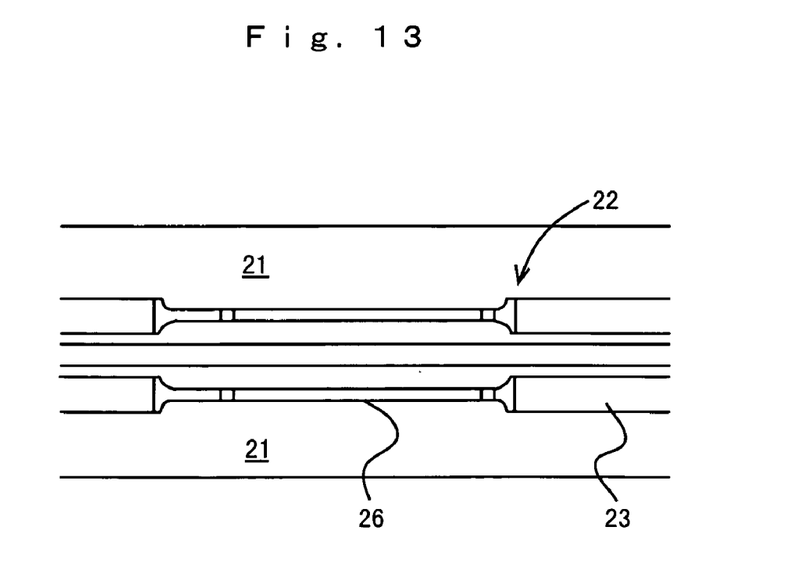
FIG. 13 is a front view showing a central portion of an opposing jaw in which a recess corresponding to a shape of a longitudinally sealed portion formed narrowly is formed in the ultrasonic sealing apparatus of the present invention.
Figure 14:
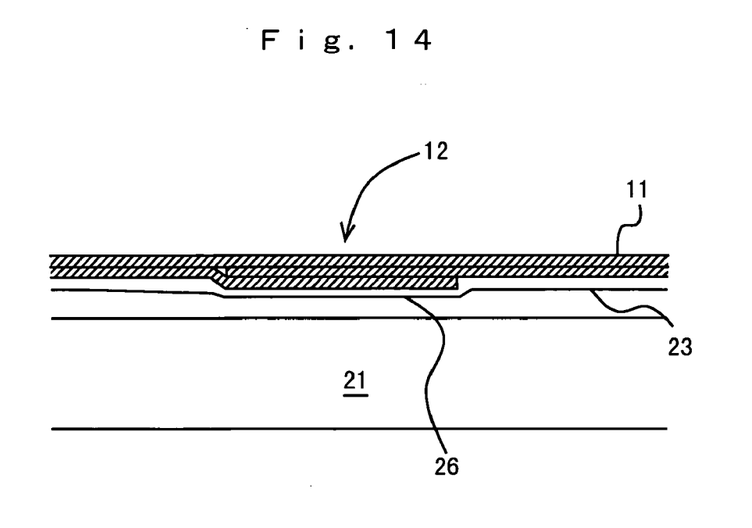
FIG. 14 is a side view showing the laminated packaging material and the central portion of the opposing jaw in which the recess corresponding to the shape of the longitudinally sealed portion formed narrowly is formed in the ultrasonic sealing apparatus of the present invention.

In FIG. 13 and FIG. 14, there is shown a central portion of the opposing jaw in which a recess 26 corresponding to a shape of the longitudinally sealed portion is formed in the pressing face 24 narrowly along a direction perpendicular to the longitudinal direction of the pressing face. Further, In FIG. 14, there is shown a state just before the three-ply portion 12 butts against the recess 26 corresponding to the shape of the longitudinally sealed portion after the tubular laminated packaging material 11 has been pressed.

Figure 15:
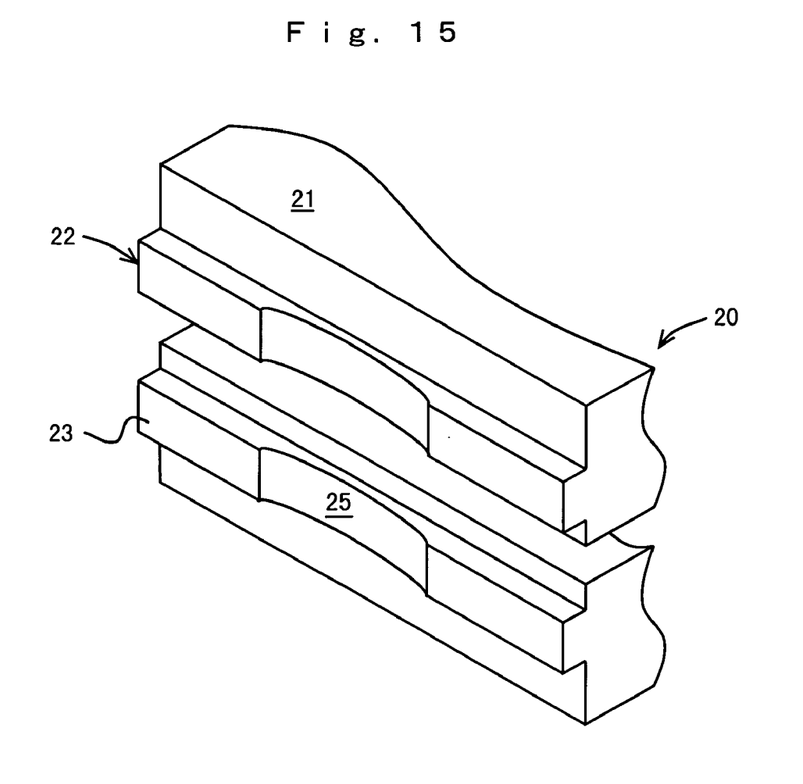
FIG. 15 is a schematic perspective view showing a main portion of an opposing jaw in which a recess having an arc shape in section is formed in a center portion in longitudinal direction of a pressing face in the ultrasonic sealing apparatus of the present invention.
Figure 16:
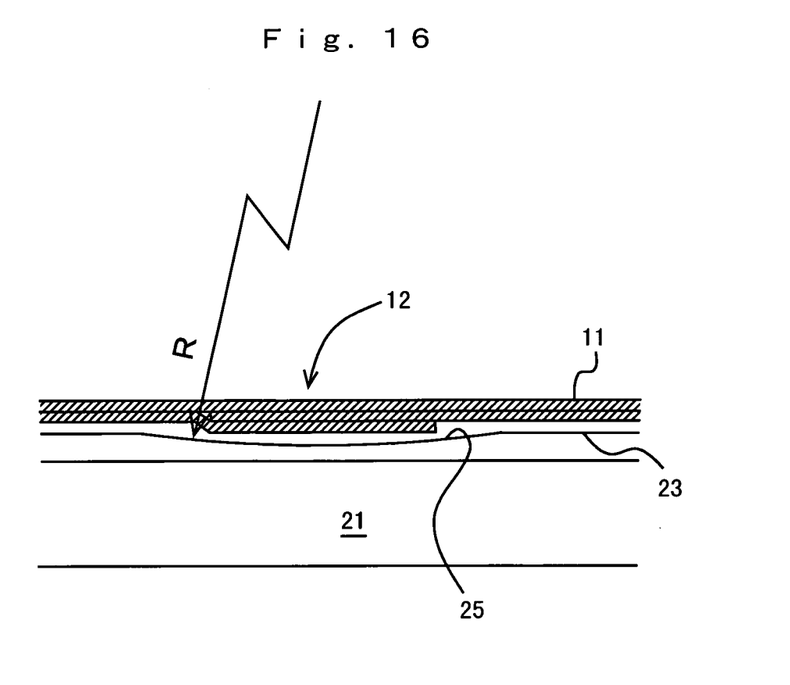
FIG. 16 is a side view showing a laminated packaging materia and the main portion of the opposing jaw in which the recess having the arc shape in section is formed in the center portion in longitudinal direction of the pressing face in the ultrasonic sealing apparatus of the present invention.

In FIG. 15 and FIG. 16, there is shown a main portion of the opposing jaw 20 in which the recess 25 having an arc shape in section is formed along a direction perpendicular to the longitudinal direction of the pressing face in the center portion in a longitudinal direction of the pressing face formed in the opposing jaw working portion 22 provided on one face of the opposing jaw body 21 of the opposing jaw 20. As shown in FIG. 16, a length of the recess 25 having an arc shape in section of the center portion in longitudinal direction of the pressing face of the opposing jaw 20 is longer than that of the longitudinally sealed three-ply portion 12 of the tubular laminated packaging material 11 under a pressed state.

Figure 17:
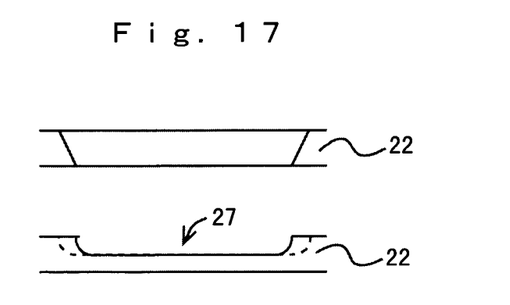
FIGS. 17 to 22 are views showing main portions of opposing jaws in which recesses of various shapes are formed in center portions of pressing faces in the ultrasonic sealing apparatus of the present invention.
Figure 18:
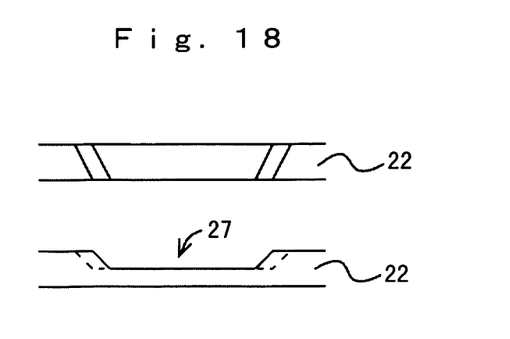
Figure 19:
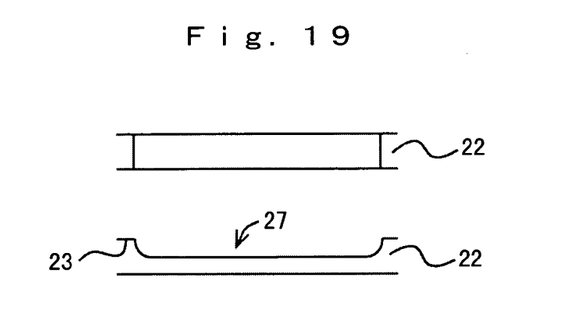
Figure 20:
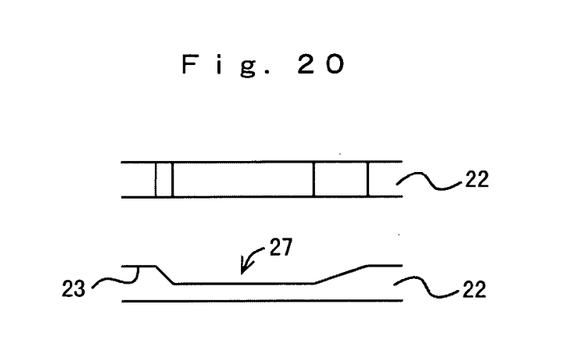
Figure 21:
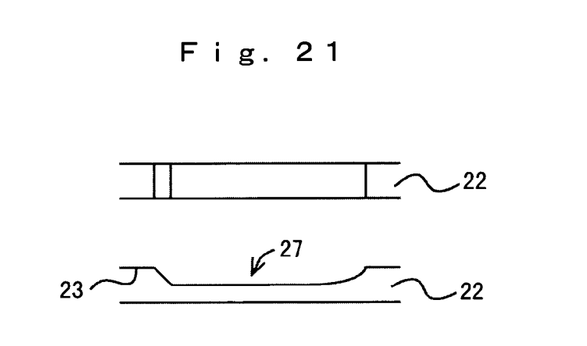
Figure 22:
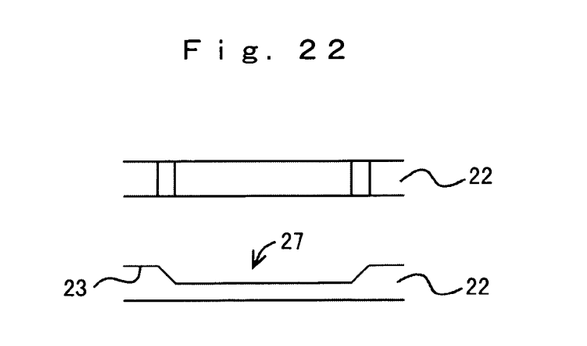

Further, in FIG. 17-FIG. 22, there are shown main portions of the opposing jaws 20 in which recesses 27 of various shapes are formed along a direction perpendicular to the longitudinal direction of the pressing faces in the center portions in longitudinal direction of the pressing faces formed in the opposing jaw working portions 22 provided on one face of the opposing jaw bodies of the opposing jaws. In FIG. 17, there is shown the opposing jaw having the pressing face in which step portions are slantingly formed and end portions of the recess are formed in arc shapes in section. In FIG. 18, the opposing jaw having the pressing face in which the step portions are slantingly formed and the end portions of the recess are formed in obtuse angles. In FIG. 19, the opposing jaw having the pressing face in which the end portions of the recess are formed in arc shapes in section. In FIG. 20, the opposing jaw having the pressing face in which inclinations of step portions are different and the end portions of the recess are formed in obtuse angles. In FIG. 21, the opposing jaw having the pressing face in which one end portion of the recess is formed in an obtuse angle and the other is formed in an arc shape in section; and in FIG. 22, the opposing jaw having the pressing face in which the inclinations of the step portions are equal and the end portions of the recess are formed in an obtuse angle.

Figure 23:
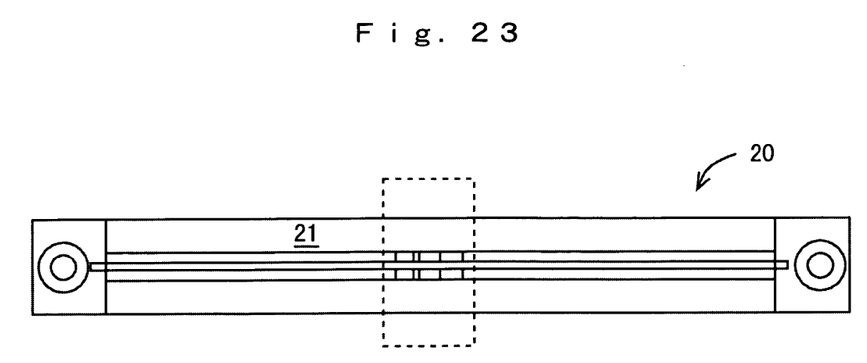
FIG. 23 is a front view showing an opposing jaw having an opposing jaw working portion of a semicircular shape, in section, in the ultrasonic sealing apparatus of the present invention.
Figure 24:
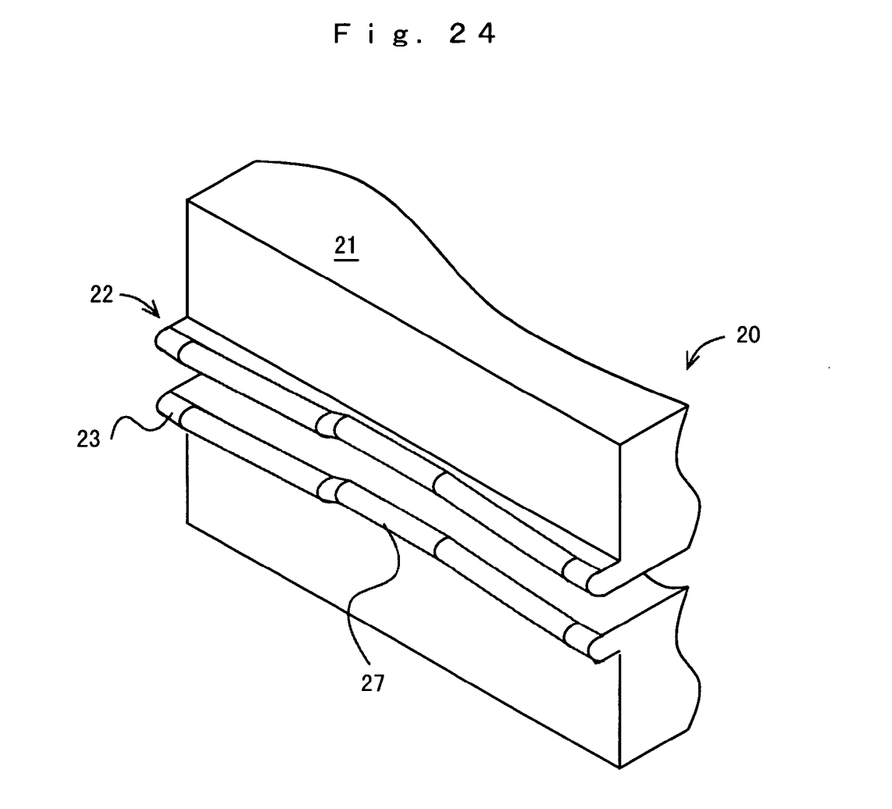
FIG. 24 is a schematic perspective view showing a central portion of the opposing jaw shown in FIG. 23 in dashed lines.
Figure 25A:
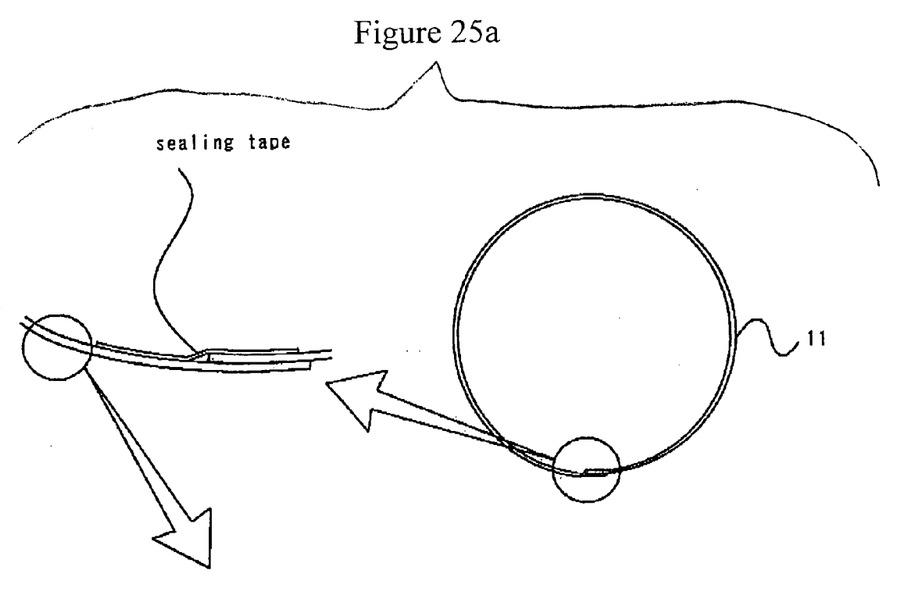
FIGS. 25a–b schematically illustrate the sealing tape of the instant invention and a construction of the laminated packaging material, respectively.
Figure 25B:
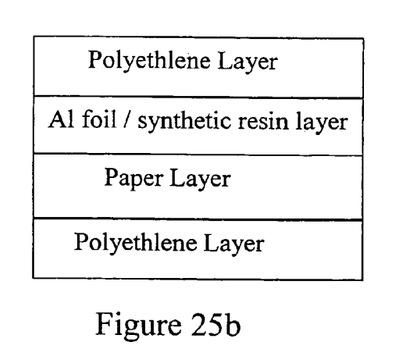

In FIG. 23 and FIG. 24, there is shown the opposing jaw 20 in which the opposing jaw working portion 22 having a semicircular shape in section is provided on one face of the opposing jaw body 21 of the opposing jaw 20. The center portion in a longitudinal direction of the pressing face formed in the opposing jaw working portion 22 is recessed in comparison with its both end portions. Since this opposing jaw 20 is provided with the opposing jaw working portion 22 having a semicircular shape in section, the degree of injuring a surface of the laminated packaging material is small.

According to the present invention, it is possible to prevent a sealing failure due to a tunnel (through passage), which occurs in the step portions in the vicinity of the both end portions of the three-ply portion due to an uneven sealing pressure in the longitudinally sealed portion when transversely ultrasonic sealing the tubular laminated packaging material below the liquid surface and the like. Further, even if the longitudinally sealed portion is deviated from the regular position of the opposing jaw, the sealing can be sufficiently performed.

What is claimed is:

1. An ultrasonic sealing apparatus, in which a laminated packaging material containing at least a thermoplastic resin layer is formed into a tubular form and the tubular laminated packaging material is transversely ultrasonically sealed, said ultrasonic sealing apparatus comprising:
    a horn having an elongated and flat sealing face; and
    an opposing jaw having an elongated pressing face that presses the tubular laminated packaging material in cooperation with the sealing face of the horn, said elongated pressing face extending in a longitudinal direction and having a center portion and two end portions wherein the center portion is narrower than both end portions.

2. An ultrasonic sealing apparatus according to claim 1, wherein the laminated packaging material contains a paper layer.

3. An ultrasonic sealing apparatus according to claim 1, wherein the transverse ultrasonic sealing is ultrasonic sealing with a fluid, and the ultrasonic horn and the opposing jaw press together to seal the tubular laminated packaging material filled with fluid content.

4. An ultrasonic sealing apparatus according to claim 1, wherein a length of the center portion, in the longitudinal direction of the pressing face of the opposing jaw is at least longer than a length of a longitudinally sealed three-ply portion of the tubular laminated packaging material under a pressed state.

5. An ultrasonic sealing apparatus according to claim 1, wherein a width of the center portion is ¼ to ½ of a width of the pressing face at both end portions.

6. An ultrasonic sealing apparatus according to claim 1, wherein the narrow center portion has a recess formed along a direction perpendicular to the longitudinal direction of the pressing face.

7. An ultrasonic sealing apparatus according to claim 6, wherein the formed recess is a recess having an arc shape in section.

8. An ultrasonic sealing apparatus according to claim 1, further comprising sealing tape dispensing means wherein, when the laminated packaging material is formed into a tubular form, the laminated packaging material is formed into the tubular form by using sealing tape.

* * * * *